United States Patent [19]
Kaczmarek

[11] Patent Number: 5,904,305
[45] Date of Patent: May 18, 1999

[54] RUBBER REDUCING AND RECYCLING SYSTEM

[76] Inventor: Win F. Kaczmarek, 41 Hummingbird La., Streamwood, Ill. 60107

[21] Appl. No.: 08/856,306

[22] Filed: May 14, 1997

[51] Int. Cl.⁶ .................................................. B02C 18/06
[52] U.S. Cl. .......................... 241/79.1; 241/157; 241/243; 241/DIG. 31
[58] Field of Search .................................. 241/243, 79.1, 241/DIG. 31, 157, 236

[56] References Cited

U.S. PATENT DOCUMENTS

| | | | |
|---|---|---|---|
| 2,126,672 | 8/1938 | Smith et al. | 18/52 |
| 3,817,463 | 6/1974 | Krigbaum | 241/152 R |
| 3,931,935 | 1/1976 | Holman | 241/24 |
| 3,991,944 | 11/1976 | Baikoff | 241/36 |
| 4,374,573 | 2/1983 | Rouse et al. | 241/101.7 |
| 4,607,800 | 8/1986 | Barclay | 241/159 |
| 4,717,085 | 1/1988 | Crane | 241/236 |
| 4,726,530 | 2/1988 | Miller et al. | 241/24 |
| 4,733,828 | 3/1988 | Potts | 241/236 |
| 4,757,949 | 7/1988 | Horton | 241/38 |
| 4,781,331 | 11/1988 | Potts | 241/236 |
| 5,048,764 | 9/1991 | Flament | 241/36 |
| 5,094,392 | 3/1992 | Szombathy | 241/167 |
| 5,141,168 | 8/1992 | Pepper | 241/236 |
| 5,169,078 | 12/1992 | Lamar | 241/222 |
| 5,248,100 | 9/1993 | Arakawa | 241/34 |
| 5,366,165 | 11/1994 | Jackman | 241/24 |
| 5,411,216 | 5/1995 | O'Keefe | 241/24 |
| 5,452,860 | 9/1995 | Williams | 241/78 |
| 5,511,729 | 4/1996 | Husain | 241/46.01 |
| 5,562,255 | 10/1996 | Witko et al. | 241/158 |
| 5,562,257 | 10/1996 | Graveman et al. | 241/190 |
| 5,676,321 | 10/1997 | Kroger | 241/236 |

*Primary Examiner*—John M. Husar
*Attorney, Agent, or Firm*—Leydig, Voit & Mayer, Ltd.

[57] ABSTRACT

A rubber reduction and recycling system with dramatically reduced power requirements. The present invention provides a series of reduction stations which successively reduce the size of the rubber, typically in the form of tires, to eventually result in crumb rubber. The power requirements are dramatically reduced by providing a fixed cutting plate through which the teeth of the cutting apparatus pass and cut the rubber in a shearing fashion. Moreover, the teeth of the cutting apparatus pass through the fixed cutting plate at an angular disposition so that at any given point, a relatively small portion of the rubber is being cut and thereby consuming power. Finally, the power consumption is reduced by providing the teeth on rotating shafts in a plurality of series of arcuate patterns. Therefore, at any given time, only a relatively small number of teeth in each series cut at the same time and thereby require power.

19 Claims, 7 Drawing Sheets

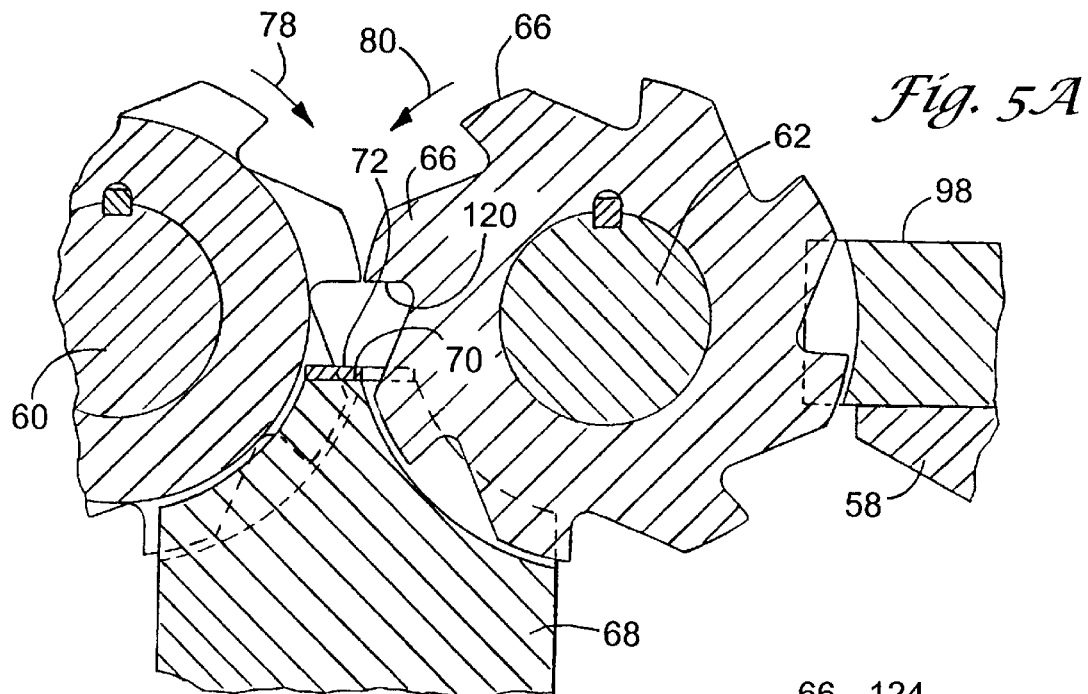
*Fig. 5A*
*Fig. 6*
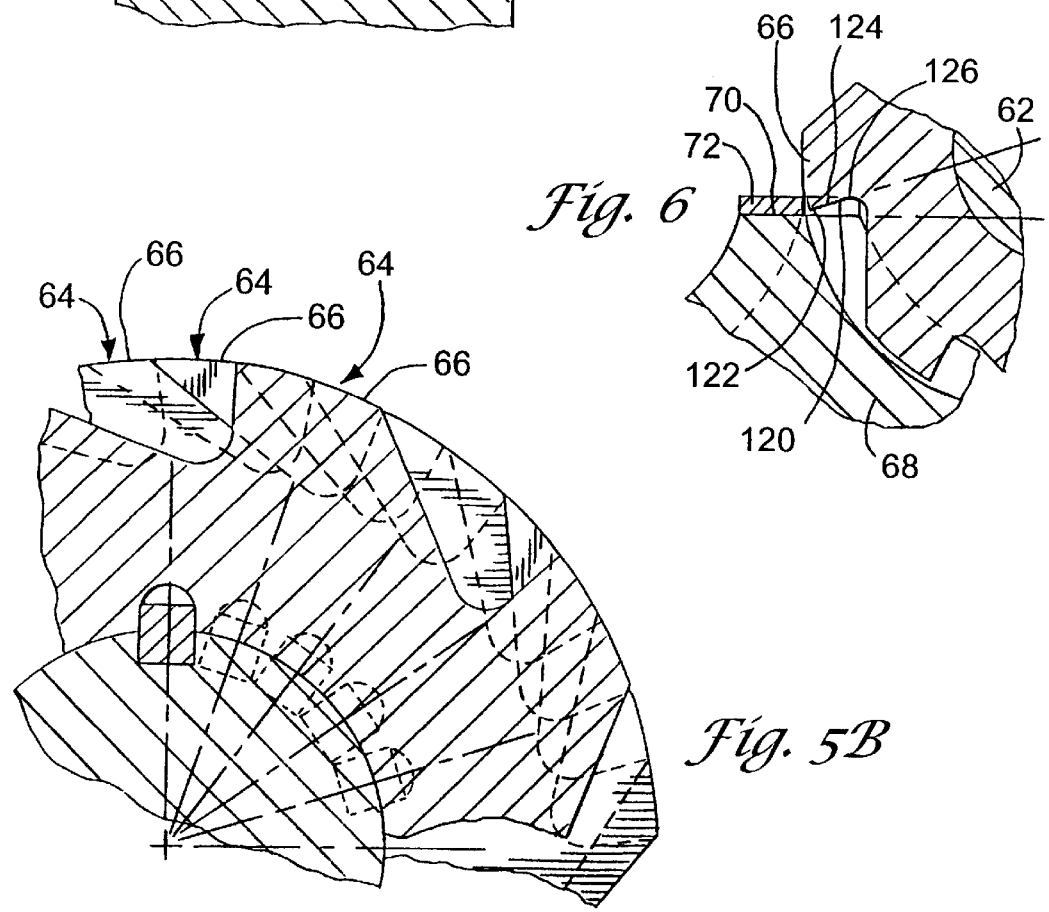
*Fig. 5B*

RUBBER REDUCING AND RECYCLING SYSTEM

FIELD OF THE INVENTION

The present invention generally relates to rubber recycling apparatus and the size reduction of other materials, and more particularly relates to rubber tire reducing and recycling systems.

BACKGROUND OF THE INVENTION

Every year hundreds of millions of rubber truck and car tires are worn out and discarded. In the past, and continuing to a lesser degree today, the tires were buried in underground dumps. However, rubber does not degrade and will therefore remain in the ground forever and cause an environmentally undesirable situation. Moreover, given the buoyancy of the tires they tend to rise to the top of the ground regardless of the location in which they are buried and ultimately cause an unsightly and disruptive protrusion through the surface of the ground.

Systems have therefore been developed to attempt to recycle the tires into a useable form for incorporation into new tires, or for reduction into pellets or crumb rubber which can be used for a variety of purposes, including use as a fuel source. A problem encountered by burning tires as a fuel source is that the tires in their original form are extremely bulky and costly to store and transport, and in addition, make for relatively inefficient combustion given their shape. It is therefore advantageous to reduce the tires into small particles or crumb rubber on the order of a few millimeters in cross section.

Machines are therefore in existence which shred, or tear, or in some other way reduce the tires into smaller pieces for eventual use as a fuel source. One such example is disclosed in U.S. Pat. No. 5,411,216. As disclosed therein, a pair of rotating shafts are provided with teeth which intermesh as the shafts rotate. The rubber is torn apart as the shafts rotate against each other in opposite directions, literally pulling the rubber apart. However, by employing a pulling action a relatively large amount of power is required to pull the rubber in opposite directions until the pulling force is beyond the tensile strength of the rubber, and the rubber effectively "snaps" apart. Such a process results in non-uniformly sized particles.

Another example of such a system is disclosed in U.S. Pat. No. 5,511,729, issued to Husain, which also reduces the rubber in the form of rotating shafts which have intermeshing teeth designed to pull the rubber apart. The Husain reference provides pockets in each tooth to prevent clogging of the system, but again the horsepower requirements of the system are substantial.

To put the horsepower requirements in more quantitative terms, a typical system which "pulls" the rubber apart will normally require a minimum of 5,000 horsepower to produce approximately 6,000 lbs of fine crumb rubber per hour from tire stock. Given the ever increasing energy costs of most locations, the cost for powering 5,000 horsepower places a huge burden on the eventual cost effectiveness of tire recycling.

Moreover, by recycling tires in a manner similar to the devices mentioned above, an enormous physical burden is placed on the actual teeth of the rotating shafts which causes the teeth to become dulled and eventually unusable in relatively short order. This situation is made even more problematic by the fact that the process of resharpening or replacing the toothed shafts is an extremely time consuming and costly measure. For example, it can take a minimum of 8 hours to replace or regrind a cutting shaft, and in most situations this operation needs to be performed at least monthly. This results in an annual maintenance cost on the order of hundreds of thousands of dollars.

SUMMARY OF THE INVENTION

It is therefore a primary aim of the present invention to provide a tire recycling system which dramatically reduces the horsepower requirements for reducing whole tires to crumb rubber.

It is an objective of the present invention to provide a tire recycling system with relatively low maintenance costs and relatively infrequent requirements for blade replacement and resharpening.

It is a feature of the present invention to reduce the power requirements of a tire recycling system by providing rotating shafts having teeth disposed thereon in a plurality of series of arcuate patterns which rotate past a fixed cutting surface and shear the rubber into smaller pieces. By providing the teeth in series of arcuate patterns, a relatively small number of teeth in each series shear against the fixed cutting surface at any given time. As opposed to prior art systems which cut along the entire length of the shaft at all times, this reduced number of cutting points dramatically reduces energy costs.

It is another feature of the present invention to provide a tire recycling system with reduced energy requirements by providing toothed shafts which rotate past a fixed cutting surface and wherein the teeth are provided with leading edges and trailing edges. The leading edge of each tooth engages the fixed cutting surface initially and performs the first cutting of the rubber. As the shafts continue to rotate, progressively deeper sections of the teeth cut against the fixed cutting surface until eventually the trailing edge passes by the fixed cutting surface. Therefore, rather than having the entire cutting surface of each tooth engage the rubber between the fixed cutting surface at the same time, relatively small portions of the teeth cut at any given time, which therefore reduces the energy and power requirements of the system.

It is yet another feature of the present invention to provide a tire recycling system with reduced energy requirements by providing toothed shafts which rotate past a fixed cutting surface. Therefore, power is only required to rotate the shaft, as opposed to prior art systems which provide two rotating shafts with intermeshing teeth which each grip the rubber and attempt to pull the rubber apart. The present invention, on the other hand, provides a shearing action with dramatically reduced energy requirements.

It is yet another feature of the present invention to provide a tire recycling system which results in the production of particles with a relatively uniform size and shape. Whereas prior art systems produce inconsistently sized and shaped particles, the shearing action of the present invention insures uniformity in particle size and shape.

It is a still further feature of the present invention to provide a tire recycling system with reduced maintenance costs by providing replaceable cutting inserts which can be removably attached to the rotating shafts. Therefore, rather than requiring that the entire toothed shaft be removed for resharpening and replacement, the shafts can be left in place, and the individual inserts can be replaced and/or resharpened.

These and other objectives and features of the present invention will become more apparent from the following detailed description when taken in conjunction with the accompanying drawings.

BRIEF DESCRIPTION OF THE DRAWINGS

FIG. 5A is an enlarged sectional view of the shafts of the 1" machine;

FIG. 5B is a enlarged partial sectional view of one shaft of the 1" machine showing the individual plates being disposed in arcuate patterns on the shaft;

FIG. 6 is an enlarged partial sectional view of the two teeth from a 1" machine plate and their angle of engagement with the cutting bed;

Figure 1:
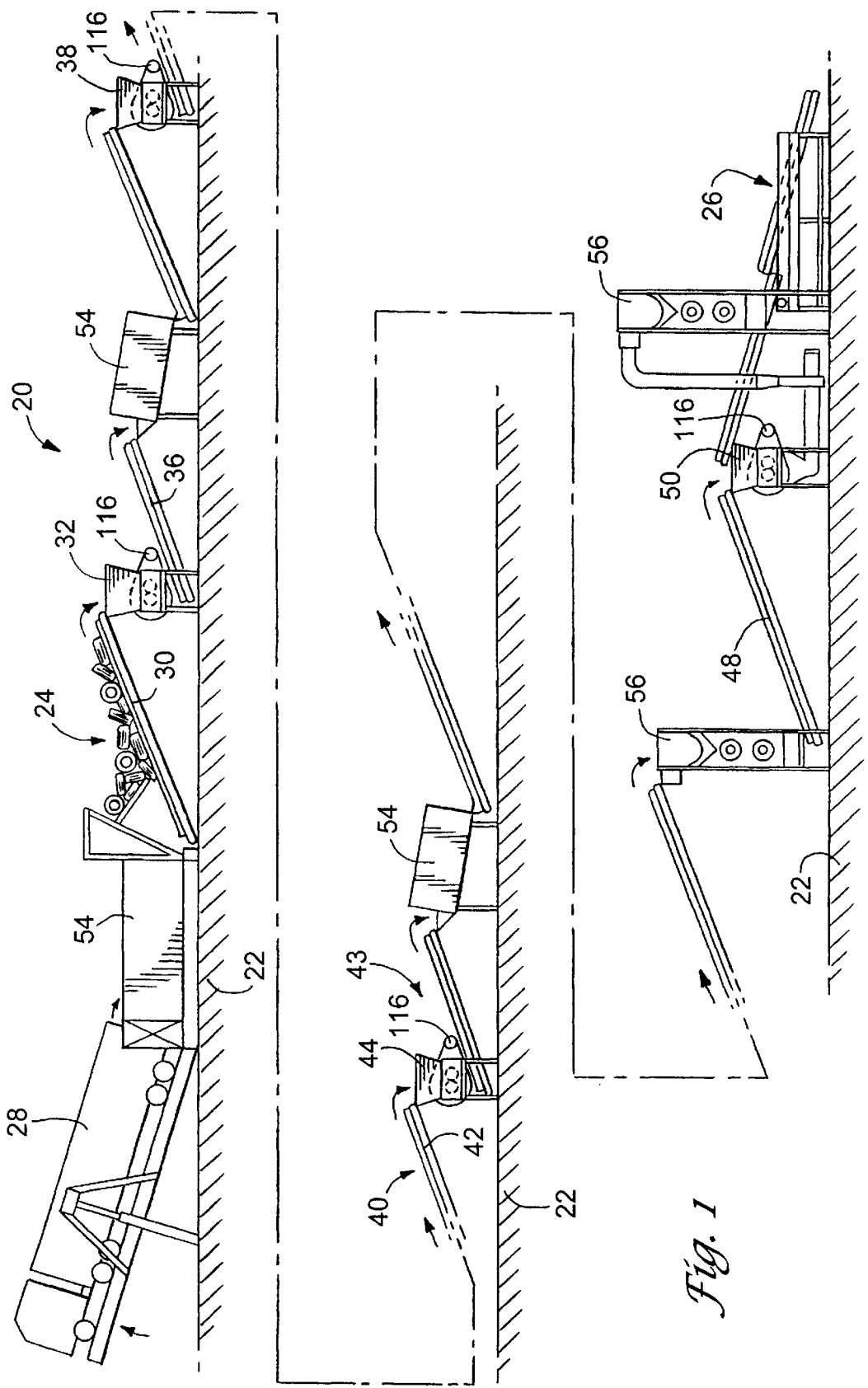
FIG. 1 is a schematic view of the overall system of the present invention.

While the present invention is susceptible of various modifications and alternative constructions, certain illustrative embodiments thereof have been shown in the drawings and will be described below in detail. It should be understood, however, that there is no intention to limit the present invention to the specific forms disclosed, but on the contrary, the intention is to cover all modifications, alternative constructions and equivalents falling within the spirit and scope of the present invention as defined by the appended claims.

DETAILED DESCRIPTION OF THE PREFERRED EMBODIMENT

Referring now to FIG. 1, the rubber reducing and recycling system of the present invention is generally referred to in schematic form at 20. As can be appreciated by FIG. 1, recycling system 20 is configured on shop floor 22 such that input rubber 24 progresses linearly from station to station and eventually results in crumb rubber 26. As is conventional, system 20 is adapted to receive loads of input rubber 24 typically in the form of automobile tires, from incoming trucks 28. The input rubber 24 is initially communicated to a conveying mechanism 30 which deposits input rubber 24 into full tire reduction machine 32. The actual operation of full tire reduction machine 32 will be described in further detail herein, but by way of overview, it is sufficient to say that full tire reduction machine 32 reduces input rubber 24 from full tires to reduced pieces 34 which, in the preferred embodiment, are on the order of four (4) inches by six (6) inches.

Reduced pieces 34 (see FIG. 2) are then communicated by second conveyor 36 to one (1) inch tire reduction machine 38 as will be described in further detail herein. One (1) inch tire machine 38 reduces pieces 34 into reduced pieces 40 which, in the preferred embodiment, are on the order of 1 in.$^2$ in size. Pieces 40 are then communicated via conveyor 42 to a third reduction machine 44 which further reduces pieces 40 to reduced pieces 43 which, in the preferred embodiment, are on the order of approximately ¼in.$^2$ in size. Pieces 43 are then communicated via conveyor 48 to a final reduction machine 50 which performs a final reduction of the pieces 43 to crumb rubber 26. Given its petroleum base; crumb rubber 26 is then able to be used, inter alia, as a fuel source. It is to be understood that in alternative embodiments, the present invention could also include one or more washer stations 54, and one or more magnetic removal stations 56 to remove ferrous material such as steel bands included in radial tires.

As stated above, the reduction of full tires 24 to small rubber pellets or crumb rubber 26 has been practiced for a number of years. However, the inventive features of the present invention are directed toward the reduction of the horsepower requirements for such a system and the production of uniformly sized and shaped particles. The present invention reduces the power requirements in at least three ways. One, the rubber is sheared by a toothed shaft rotating past a fixed surface. This results in a substantial savings in power as opposed to prior art systems which use two rotating shafts which rotate against each other and pull the rubber apart. Two, the present invention uses a toothed shaft having a plurality of series of teeth disposed in arcuate patterns across the shaft so that as the shaft rotates past the fixed surface, only a limited number of teeth actually shear against the fixed surface at any given time. In the preferred embodiment, only one fourth of the teeth on any given series cut at the same time as opposed to prior art systems wherein cutting or pulling is being performed across the entire axial length of the shafts at all times. Three, the teeth of the present invention are shaped so as to shear against the fixed surface at an opposing angle and therefore only a limited portion of each tooth surface cuts at any given time and thus requires reduced horsepower. This is in direct opposition to prior art devices wherein teeth cut against other teeth in parallel orientation, causing the cut to occur across the entire plane of each cutting surface and therefore requiring excessive amounts of power.

Figure 2:
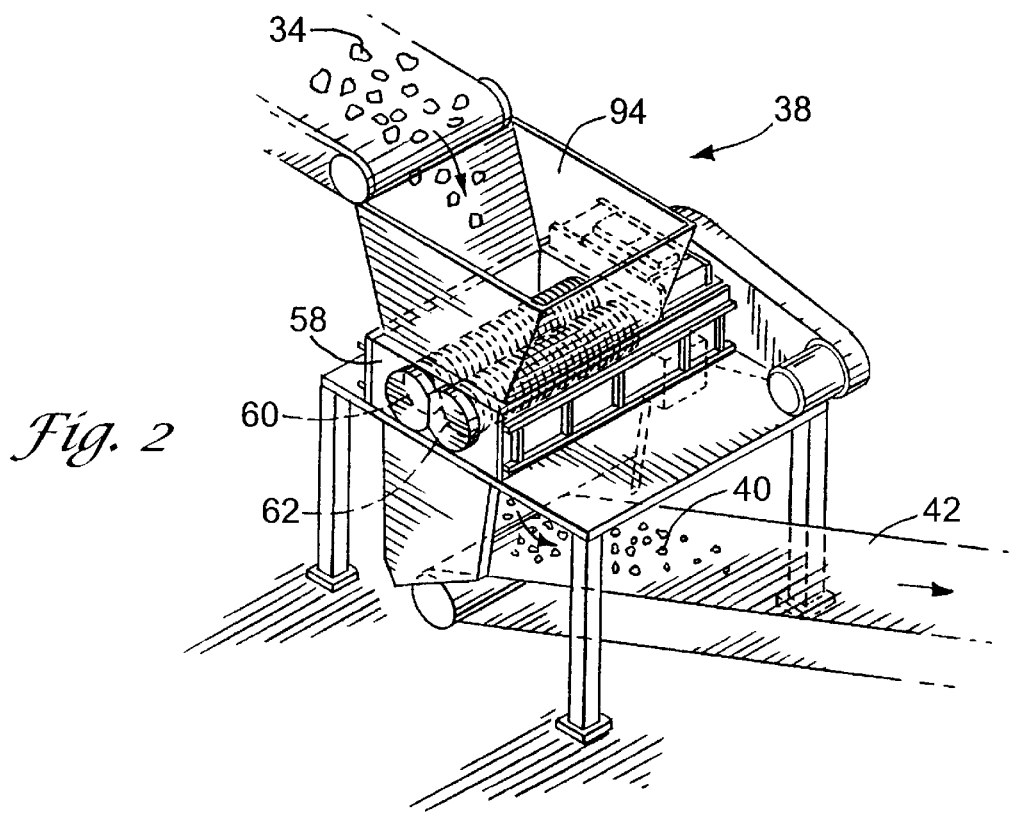
FIG. 2 is a perspective view of the 1" tire reduction machine.
Figure 3:
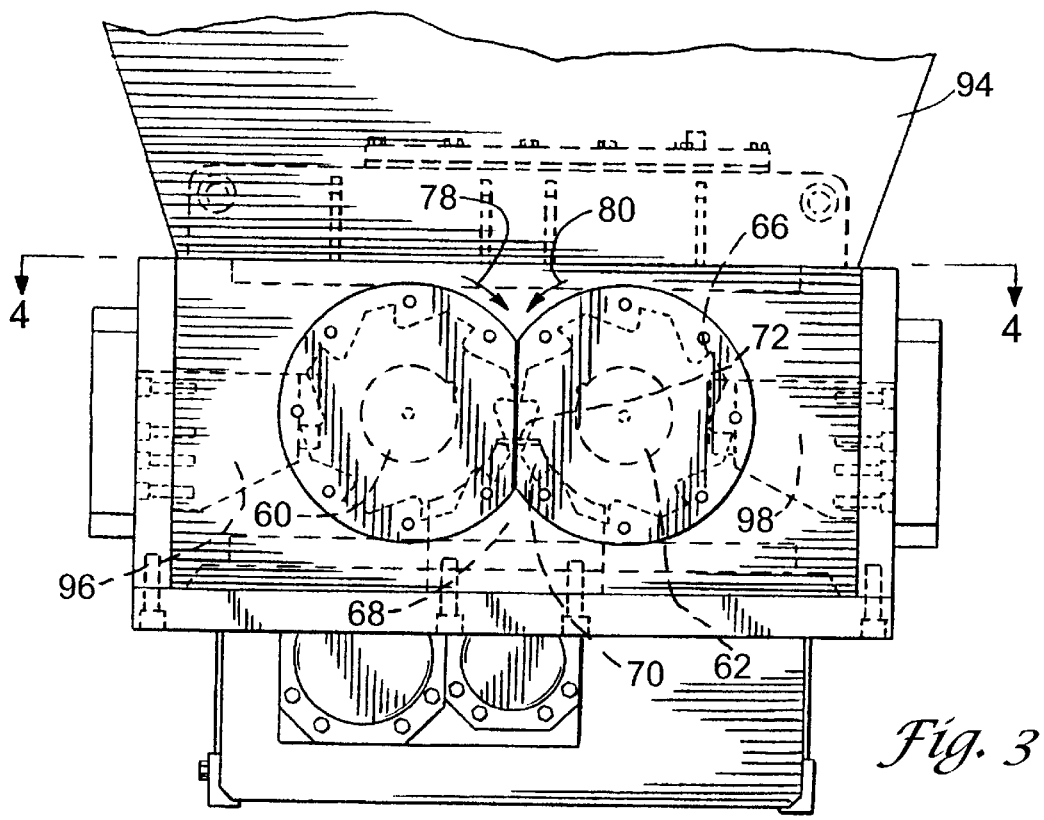
FIG. 3 is an end view of the embodiment shown in FIG. 2.

Each of these inventive features will now be described in further detail at first with reference to FIG. 2. As shown therein, second tire reduction station 38 is provided with rectangular housing 58 in which first shaft 60 and second shaft 62 are mounted for parallel rotation. As can be seen best with reference to FIGS. 3, 4, and 5B, each shaft 62 is provided with a plurality of series 64 of teeth 66, and a center bed 68 is mounted to housing 58 which protrudes upward so as to be disposed between shafts 60 and 62. Center bed 68 is provided with a top surface 70 to which a center bar 72 is removably mounted. Center bar 72 includes a plurality of notches 74 shaped to matingly receive teeth 66 as shafts 60 and 62 rotate. It is against the sharpened cutting edges 76 of notches 74 that teeth 66 shear. It can therefore be seen that as shaft 60 rotates in the direction indicated by arrow 78 and as second shaft 62 rotates in the opposite direction indicated by arrow 80, rubber pieces 34 are sheared by the interaction by teeth 66 and center bar 72 to result in pieces 40 corresponding to the shape of notches 74.

Figure 12:
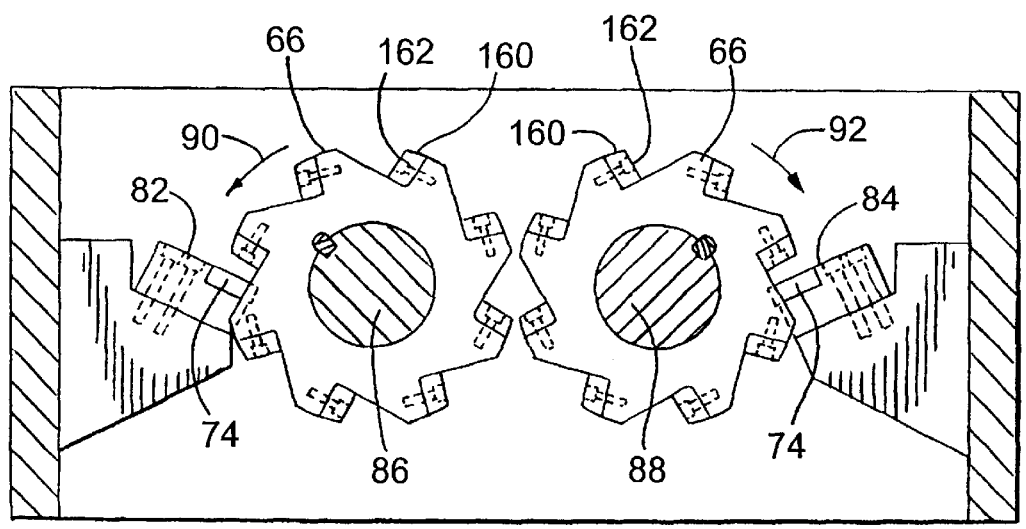
FIG. 12 is a schematic view of an alternative embodiment showing the replaceable cutting inserts and side cutting bars.

It is important to note that in an alternative embodiment as best shown in FIG. 12, the actual cutting is performed on the outside of shafts 60 and 62 by the provision of sidebars 82 and 84. Sidebars 82 and 84 are provided with a plurality of notches 74, similar to center bed 68, which matingly receive teeth 66 as shaft 86 rotates in the direction indicated by arrow 90 and as second shaft 88 rotates in the opposite direction indicated by arrow 92. Depending on operating criterion, it may be more desirable to provide the actual fixed cutting surface on the outside such as with sidebars 82 and 84 to allow for easier access to the cutting surfaces for removal and sharpening purposes.

Figure 4:
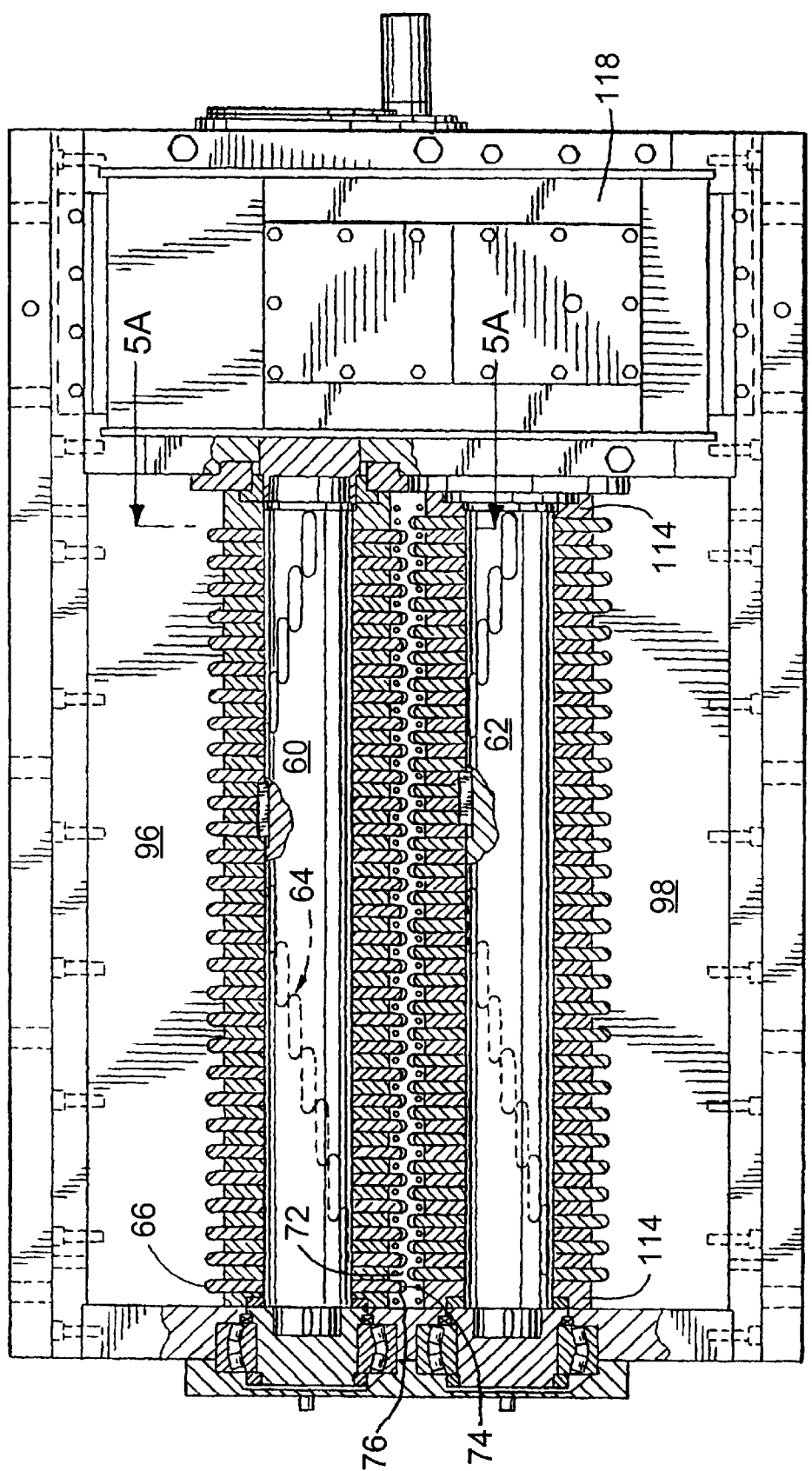
FIG. 4 is a sectional view of the embodiment shown in FIG. 3 taken along line C–C.

Referring again to FIG. 2, it can be seen that a hopper 94 is provided above housing 58 to receive rubber pieces 34 and direct them between shafts 60 and 62. In order to prevent rubber pieces 34 from passing around the outside of the shafts in the first embodiment, side fingers 96 and 98 are provided. As best shown in FIG. 4, side fingers 96 and 98 are shaped to match the profile of toothed shafts 60 and 62 and therefore fill any gaps therebetween and prevent rubber pieces 34 from passing therethrough.

Figure 8:
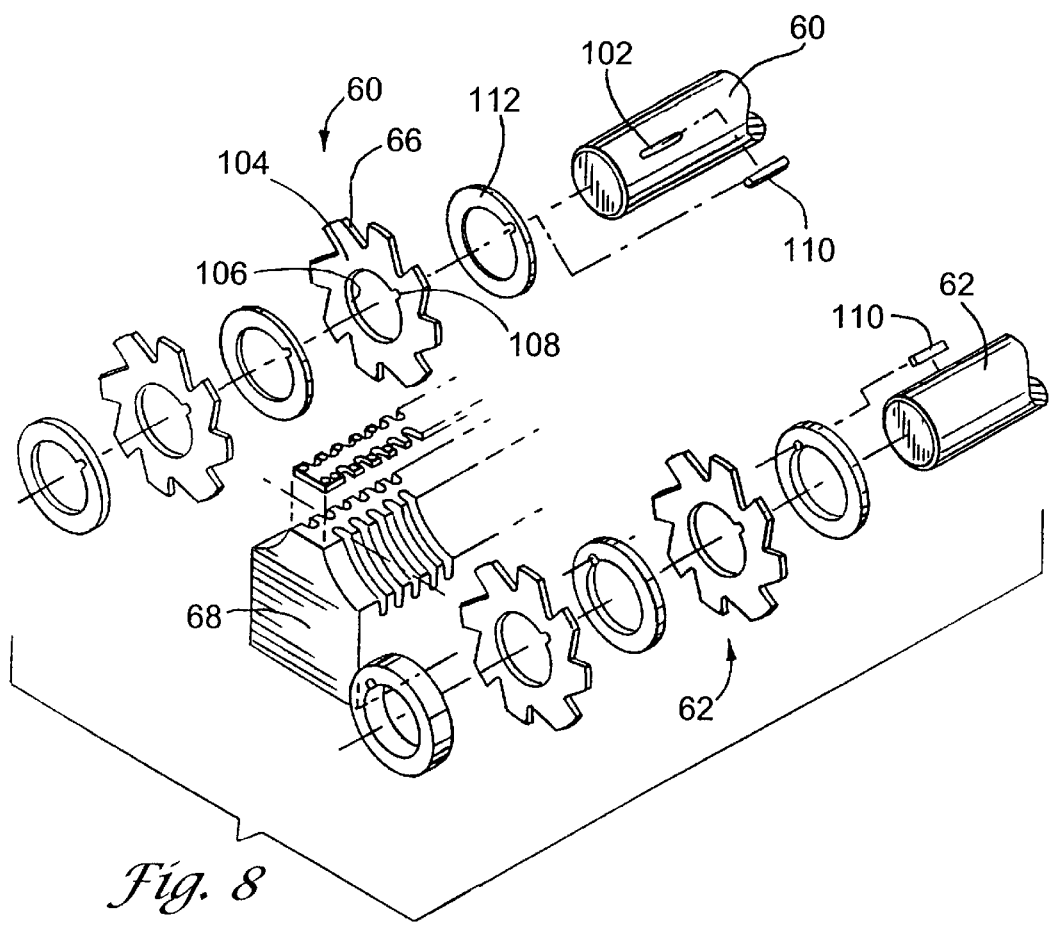
FIG. 8 is an exploded view of the 1" machine shafts, toothed plates, spacer plates, and center bed.

Referring now to FIG. 8, the actual method by which shafts 60 and 62 are assembled can be appreciated. As shown therein, metal shaft 60 is initially provided with a plurality of keyways 102 machined therein in arcuate patterns. A plurality of identical plates 104 are then provided having teeth 66 on the outer circumference thereof and inner aperture 106 provided with keyways 108. Plates 104 can then be positioned around metal shaft 60 such that keyways 108 and 102 are proximate one another and key 110 can then be provided within keyways 102 and 108 to frictionally hold plates 104 to shaft 60. By providing keyways 102 in arcuate patterns around the circumference of metal shaft 60, once the plates 104 are assembled thereon, teeth 66 will be provided in aforementioned series 64 of arcuate patterns. In the preferred embodiment, keyways 102 and keys 110 are provided at a length sufficient to accommodate two plates 104. Therefore, within each series 64, sets of two plates 104 will be positioned at each given keyway 102. In order to separate plates 104, a plurality of spacer plates 112 are also provided and mounted around metal shaft 60. Plates 104 and 112 are then compressed on shaft 60 and held in position by mechanical means such as clips 114. (See FIG. 4).

From the foregoing it can be seen that shafts 60 and 62 are actually comprised of a number of individual toothed plates 104 wherein the individual teeth 66 are provided in arcuate patterns across the outer circumference of the shafts. As the shafts rotate via energy provided by motor 116 (see FIG. 1) and transmitted thereto by gear boxes 118 (see FIGS. 4 and 11) the teeth pass through notches 74 of center bar 72.

In order to fully appreciate the actual shearing process, references in now made to FIGS. 5A and 6. As shown therein, each tooth 66 is provided with a planar cutting surface 120 having leading edge 122, side edges 124 and trailing portion 126. As shafts 60 and 62 rotate, teeth 66 enter notches 74 with leading edge 122 initially entering the notch and engaging rubber piece 34 in the process. As shafts 60 and 62 continue to rotate, leading edge 122 passes through notch 74 and the actual shearing process is performed by side edges 124 of teeth 66. By the time trailing portion 126 reaches notch 74, the rubber is fully sheared away to form reduced piece 40. To fully appreciate the significance of this operation, it is important to remember that with prior art devices, the cutting action is performed by rotating teeth in opposite directions wherein the cutting surfaces engage each other in parallel fashion, which means the full planar surface of the cutting surface of both teeth engage the rubber at the same time. The cutting surfaces then continue to rotate in opposite directions until the rubber is pulled apart. Given the full engagement of the cutting surfaces, this not only requires additional horsepower due to the pulling action, but also due to the fact that the full planar cutting surfaces are engaged at the same time.

Figure 7:
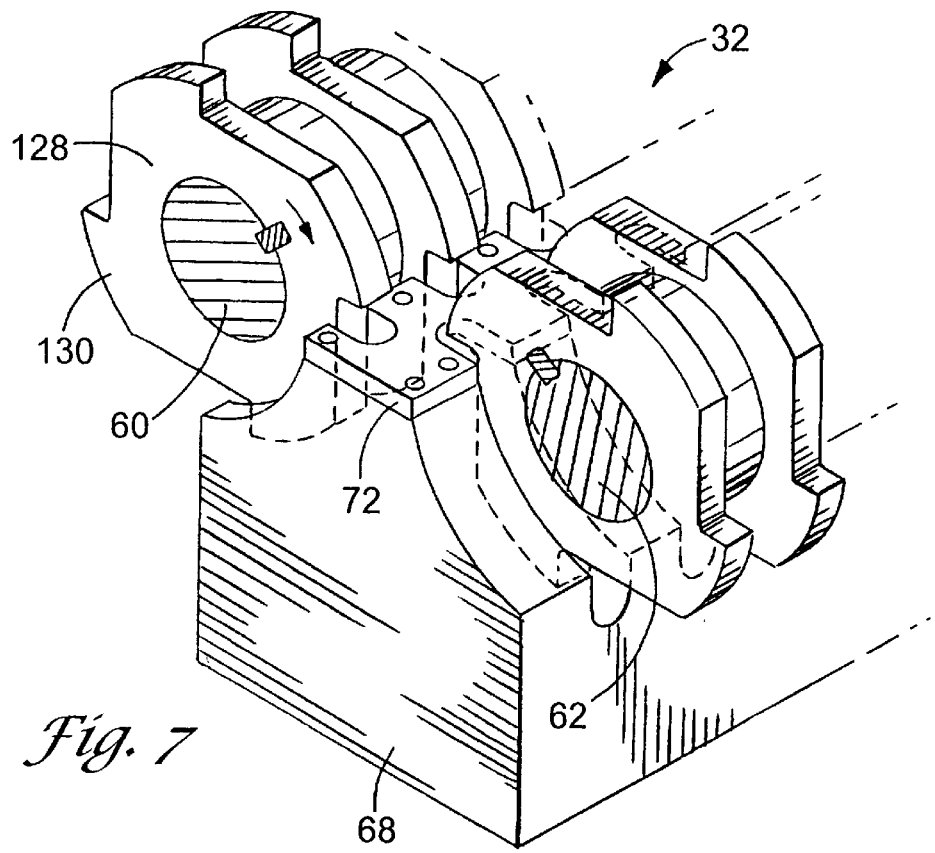
FIG. 7 is a sectional perspective view of the full tire reduction machine showing the shafts partially assembled with individual toothed plates.
Figure 9:
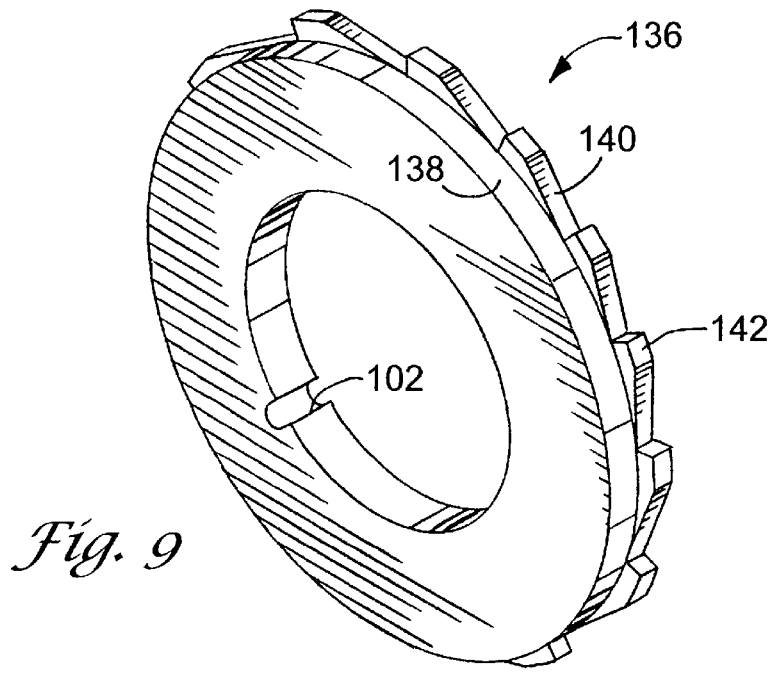
FIG. 9 is a perspective view of one toothed plate from the ¼" machine.
Figure 10:
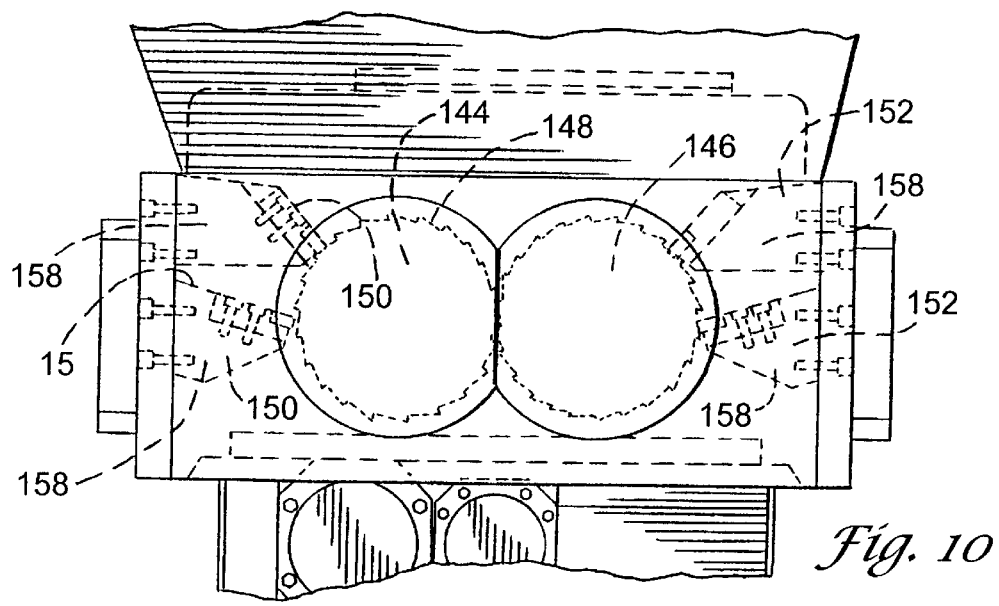
FIG. 10 is an end view of the fine mesh machine.
Figure 11:
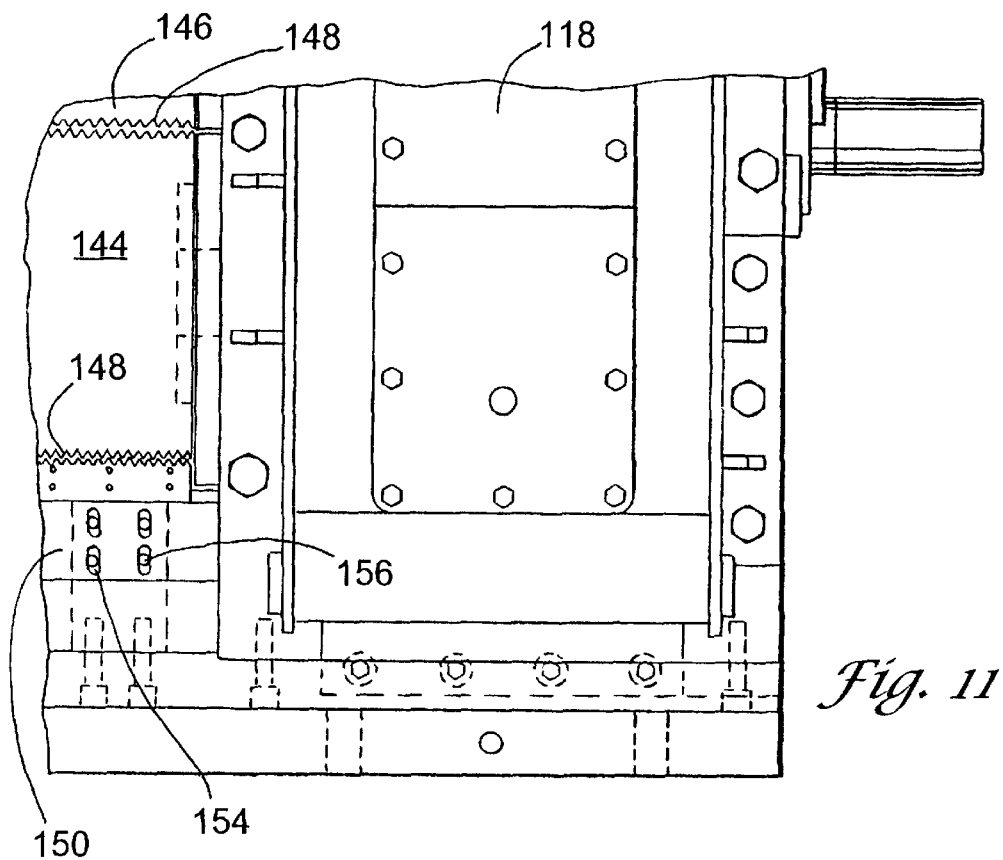
FIG. 11 is partial top view of the fine mesh machine showing the adjustable side cutting bars.

The foregoing description discloses the structure and operation of second reduction machine 38 in detail. It is to be understood that first reduction machine 32, second reduction machine 38, third reduction machine 44, and final reduction machine 50 all operate under the same principles. For the sake of completeness, however, full tire reduction machine 32 is shown in FIG. 7, a portion of third reduction machine 44 is shown in FIG. 9, and final reduction machine 50 is shown in FIGS. 10–11. The most significant difference among the reduction machines is the actual shape and size of the teeth, plates, spacers, and fixed cutting surfaces.

Referring first to FIG. 7, which shows first reduction machine 32, plates 128 thereof only include 4 individual teeth 130. Given the fact that the initial tire reduction machine 32 reduces full tires 24 to reduced pieces 34 on the order of four inches by six inches, teeth 130 are sized accordingly and a fewer number of teeth 130 are provided than with plates 104 of second reduction machine 38.

Similarly, the operation of third reduction machine 44 reduces the size of the particles even further, but again reduces the particles into uniform sizes and shapes. Referring to FIG. 9, third reduction machine 44 includes a plurality of combination plates 136 which combine the functions of the toothed plates and spacer plates. As shown, combination plates 136 include a spacer section 138 which is integral with toothed section 140. In addition, it can be seen that a greater number of teeth 142 are provided thereon than with plates 104 and certainly more than as shown with plate 128. It is also important to note that the actual shearing performed by third reduction machine 44 occurs on the outside of the shafts, as will be described in detail with reference to final reduction machine 50.

Final reduction machine 50 is shown in detail in FIGS. 10–11. As shown, the actual cutting in the preferred embodiment is performed on the outside of shafts 144 and 146 between fine teeth 148 and sidebars 150 and 152. Another inventive feature of the present invention is shown with reference to FIGS. 10–11, wherein sidebars 150 and 152 are shown to be adjustable. Each sidebar 150 and 152 is provided with a plurality of slots 154 which receive adjustable fasteners 156 in order to move sidebar 150 and 152 toward and away shafts 144 and 146 depending on the desired size of crumb rubber 26. Frames 158 are provided to receive fasteners 156. In the preferred embodiment, two sets of sidebars 150 and 152 are provided to provide for an added degree of size uniformity of crumb rubber 26.

In operation, it can therefore be seen that system 20 is provided to reduce full tires 24 to crumb rubber 26 by linearly processing the rubber through a series of four reduction machines. It is to be understood that a different number of machines can be employed to reduce the rubber, and that the actual size of the rubber pieces produced by each reduction machine can be varied. The inventive features of the present invention include the actual process by which the rubber is reduced and the machinery which performs the reduction in a less power demanding and more efficient manner than has heretofore been possible.

In addition to the reduced horsepower requirements of the present invention, another inventive feature of the present invention includes the reduced maintenance required for repair and resharpening of the cutting surfaces. As stated in the background section herein, the pulling action used by prior art devices places excessive strain on the cutting edges which tends to quickly dull the cutting surfaces. By providing a fixed cutting surface against which the teeth shear, and by providing an angular disposition of the teeth with respect to the fixed cutting surface, the strain placed on the cutting surfaces is reduced and, accordingly, the life of the sharpened teeth and cutting surfaces is increased.

In addition, when the fixed cutting surfaces need to be resharpened, the center bar can be simply removed from the center bed and resharpened, or the sidebars can be similarly removed and resharpened. In order to reduce the time required for resharpening the tooth shafts, an alternative embodiment shown in FIG. 12 of the present invention includes the provision of replaceable cutting inserts 160 which can be secured to the plates of the shafts via conventional fastener 162. Therefore, rather then remove the entire toothed shaft every time resharpening is required, the shafts can be left in place and the individual cutting inserts 160 can simply be removed and resharpened and/or replaced with a new unit. With conventional systems, the replacement and resharpening of cutting surface and shafts can take a minimum of eight (8) hours and can be required as frequently as once a month. This can annualize to an approximate cost of $600,000. With the present invention, the frequency of blade resharpening is reduced and the ease with which the resharpening can occur is improved. The estimated cost of replacement and resharpening will equate to a reduced annual cost of approximately $150,000.

From the foregoing, it can be appreciated that the present invention brings to the art an improved apparatus and method for reducing full tires to recyclable crumb rubber. The overall horsepower requirements of the system are thereby dramatically reduced which results in dramatically reduced energy costs to the operator of the system, and thus dramatically reduced costs for crumb rubber to the eventual consumer. In addition, by reducing the rubber through the unique shearing process of the present invention, not only is the horsepower requirement of the system reduced, but the maintenance requirements for the actual blades of the system are dramatically reduced, resulting in additional savings to the producer, and consumer as well.

What is claimed is:

1. A rubber reduction apparatus, comprising:

a housing having an inlet for receiving relatively large pieces of rubber, and an outlet for exhausting relatively small pieces of rubber;

first and second shafts mounted for rotation within the housing between the inlet and the outlet, a primary mover being connected to the first and second shaft for rotation thereof, the first and second shafts having a plurality of series of teeth disposed thereon, each series being arranged in arcuate orientation around the shafts, the teeth being separated by a plurality of gaps, each tooth having a planar cutting surface having a leading edge and a trailing edge;

a center bed mounted to the housing and being disposed between the first and second shafts, the center bar having a first side adjacent the first shaft and a second side adjacent the second shaft, the first and second sides having a plurality of fingers and notches therein, the notches adapted to matingly receive the shaft teeth and the fingers adapted to matingly be received by the gaps upon rotation of the shafts, the teeth being oriented on the shafts so that the leading edge of the tooth cutting surface enter the notches before the trailing edge thereof, the relatively large pieces of rubber being sheared into smaller pieces by the cutting surfaces passing through the center bar; and a replaceable cutting bar insert removably attached to the center bed, the cutting bar insert adapted to be removed for resharpening and replacement purposes.

2. The rubber reduction apparatus of claim 1 wherein only a quarter of the teeth in each series of teeth cut against the center bar at any given time.

3. The rubber reduction apparatus of claim 1 wherein the housing includes a hopper adjacent the inlet to facilitate introduction of rubber to the rotating shafts, and a conveying mechanism adjacent the outlet to facilitate removal of the reduced rubber.

4. The rubber reduction apparatus of claim 1 wherein the teeth radially extend from metal plates mounted to the shafts, each plate being separated by a spacer plate to provide the gaps.

5. The rubber reduction apparatus of claim 4 wherein the plates are provided with an internal opening having a keyway, the shafts are provided with keyways, and a metal key is provided to engage the plate keyways and shaft keyways to frictionally hold the plates to the shaft.

6. The rubber reduction apparatus of claim 5 wherein the shaft keyways are staggered across the shaft in arcuate patterns to thereby provide the arcuately arranged series of teeth upon being mounted to the shafts.

7. The rubber reduction apparatus of claim 1 wherein the teeth radially extend from circular metal plates mounted to the shaft, and the plates further include a spacer section integral therewith to axially separate the teeth.

8. The rubber reduction apparatus of claim 1 wherein the teeth are provided in the form of removable cutting inserts secured to the plates.

9. A rubber reduction apparatus, comprising:

a housing having an inlet adapted to receive relatively large pieces of rubber, and an outlet adapted to exhaust relatively small pieces of rubber;

first and second shafts mounted for rotation within the housing between the inlet and the outlet, a primary mover being connected to the first and second shafts for rotation thereof, the first and second shafts having a plurality series of teeth disposed thereon, each series being arranged in arcuate orientation on the shafts, the teeth being separated by a plurality of gaps, each tooth having a planar cutting surface having a leading edge and trailing edge; and first and second side bars mounted to the housing and straddling the first and second shafts, the first and second side bars having a plurality of fingers and notches therein, the notches adapted to matingly receive the shaft teeth and the fingers adapted to be matingly received by the gaps upon rotation of the shafts, the teeth being oriented on the shafts so that the leading edge of each tooth cutting surface enters each notch before the trailing edge thereof, the large pieces of rubber being sheared into smaller pieces by the cutting surfaces passing through the side bars.

10. The rubber reduction apparatus of claim 9, further including first and second replaceable cutting bar inserts attached to the first and second side bars, the cutting bar inserts adapted to be removed for replacement and resharpening purposes.

11. A tire recycling system adapted to reduce rubber tires into crumb rubber having a plurality of individual reduction stations adapted to receive input rubber and provide output rubber, the reduction stations being disposed in series such that the output of one reduction station is provided to the input of another reduction station, each station comprising;

a housing having an inlet for receiving relatively large pieces of rubber, and an outlet for exhausting relatively small pieces of rubber;

first and second shafts mounted for rotation within the housing between the inlet and the outlet, the primary mover being connected to the first and second shafts for rotation thereof, the first and second shafts having a plurality of teeth disposed thereon, each series being arranged in arcuate orientation on the shaft, the teeth being separated by a plurality of gaps, each tooth having a planar cutting surface having a leading edge and a trailing edge;

a center bed mounted to the housing and being disposed between the first and second shaft, the center bar having a first side adjacent the first shaft and the second side adjacent the second shaft, the first and second sides having a plurality of fingers and notches therein, the notches adapted to matingly receive the shaft teeth and the fingers adapted to matingly be received by the gaps upon rotation of the shafts, the teeth being oriented on the shaft so that the leading edge of the tooth cutting surface enters the notches before the trailing edge thereof, the large pieces of rubber being sheared into smaller pieces by the cutting surfaces passing through the center bar; and a replaceable cutting bar insert removably attached to the bed, the cutting bar insert adapted to be removed for resharping and replacement purposes.

12. The tire recycling system of claim 11 wherein the housings include hoppers adjacent the inlets to facilitate introduction of rubber to the rotating shafts, and conveying mechanisms adjacent the outlet to facilitate removal of the reduced rubber.

13. The tire recycling system of claim 12 wherein the plates are provided with an internal opening having a keyway, the shafts are provided with keyways, and a metal key is provided to engage the plate keyways and shaft keyways to frictionally hold the plates to the shafts.

14. The rubber reduction apparatus of claim 13 wherein the shaft keyways are staggered across the shaft in arcuate patterns.

15. The tire recyling of claim 11 wherein the teeth radially extend from circular metal plates mounted to the shafts, each plated being separated by a spacer plate to provide the gaps.

16. The tire recycling system of claim 11 wherein the teeth radially extend from circular metal plates mounted to the shafts, and the plates further include a spacer section to axially separate the teeth.

17. The tire recycling system of claim 11 wherein the plurality of reduction stations include first, second, third, and fourth stations wherein the first station receives whole tires and reduces the rubber therein to four (4) inch by six (6) inch pieces, the second station reduces the four (4) inch by six (6) pieces to approximately 1 in.$^2$ pieces, the third station reduces approximately 1 in.$^2$ pieces to approximately 0.375 in.$^2$ pieces, and the third station reduces the 0.375 in.$^2$ pieces to crumb rubber on the order of 0.118 in.$^2$.

18. The system of claim 11 further including a washing station for washing away debris and contaminants from the rubber.

19. The tire recycling system of claim 11 further including a magnetic removal station for removing ferrous particles from the rubber.

* * * * *